United States Patent [19]

Hirano

[11] Patent Number: 5,293,419
[45] Date of Patent: Mar. 8, 1994

[54] SIMULTANEOUS VOICE-CALL SYSTEM FOR CORDLESS TELEPHONE

[75] Inventor: Masahiro Hirano, Saitama, Japan

[73] Assignees: Pioneer Electronic Corp., Tokyo; Pioneer Communications Corp., Saitama, both of Japan

[21] Appl. No.: 875,422

[22] Filed: Apr. 29, 1992

[30] Foreign Application Priority Data

May 20, 1991 [JP] Japan ................................. 3-114512

[51] Int. Cl.⁵ ..................... H04M 11/00; H04Q 7/00
[52] U.S. Cl. ................................. 379/62; 379/58; 379/61; 379/63; 455/34.1; 455/34.2
[58] Field of Search ................. 379/58, 61, 62, 63; 455/34.1, 34.2

[56] References Cited

U.S. PATENT DOCUMENTS

| | | | |
|---|---|---|---|
| 4,682,350 | 7/1987 | Akerberg | 379/61 |
| 4,792,984 | 12/1988 | Matsuo | 455/33.4 |
| 4,856,083 | 8/1989 | Makino | 379/62 |
| 4,965,849 | 10/1990 | Kunihiro | 379/61 |
| 4,969,205 | 11/1990 | Itoh | 379/63 |
| 5,014,295 | 5/1991 | Kunihiro | 455/34.1 |

Primary Examiner—Curtis Kuntz
Assistant Examiner—Vijay Shankar
Attorney, Agent, or Firm—Sughrue, Mion, Zinn, Macpeak & Seas

[57] ABSTRACT

A simultaneous voice-call system for a cordless telephone where communication between a base unit and a plurality of portable units is established through the use of a radio communication channel. The base unit includes a transmitter/receiver which establishes a communication channel between base unit and plurality of portable units. The transmitter/receiver has a control channel and a plurality of talk channels. A portable-unit-identifying number memory stores portable-unit-identifying numbers preassigned to the plurality of portable units. A first simultaneous call controller responsive to a simultaneous call command from a user to establish a talk-channel between the plurality of portable units by transmitting through the control channel portable-unit-identifying numbers stored in the portable-unit-identifying number memory, a vacant-talk-channel number, and a simultaneous call code to the plurality of portable units. The talk-channel is a radio communication channel through which a message is transmitted from the base unit to the plurality of portable units. The simultaneous call code indicates that the message is transmitted to the portable units at the same time. Each of the plurality of portable units includes a portable-unit-identifying number assigned thereto and a second simultaneous call controller.

1 Claim, 4 Drawing Sheets

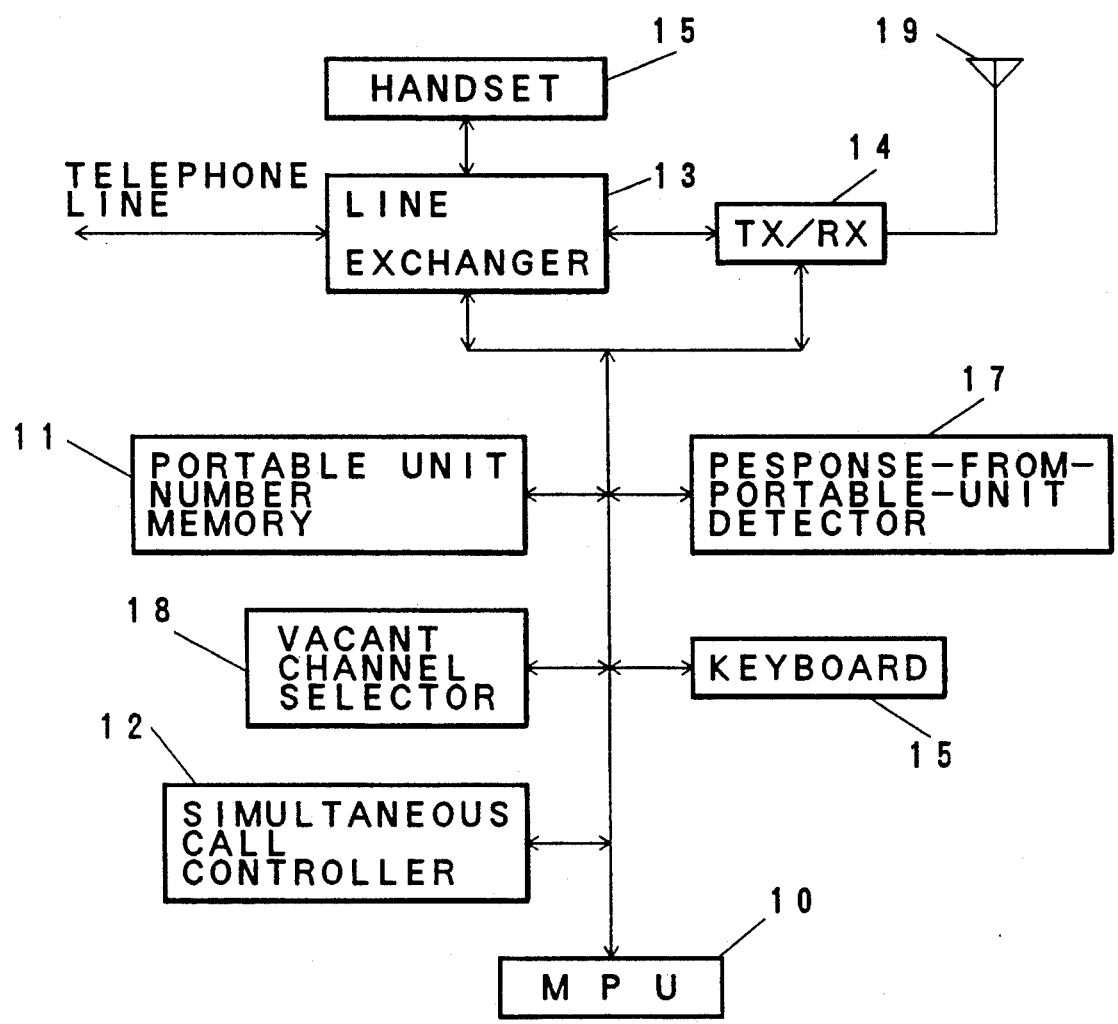

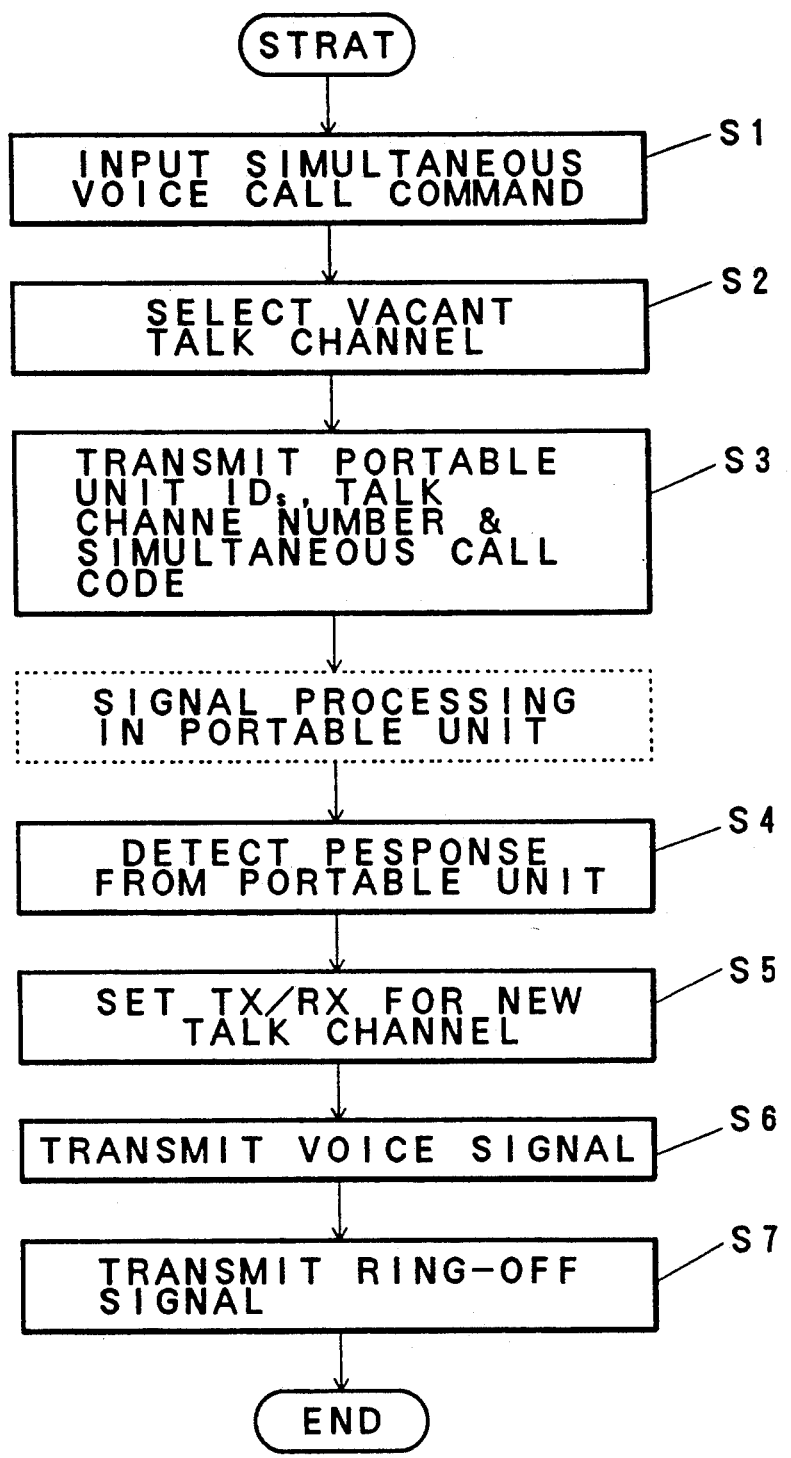

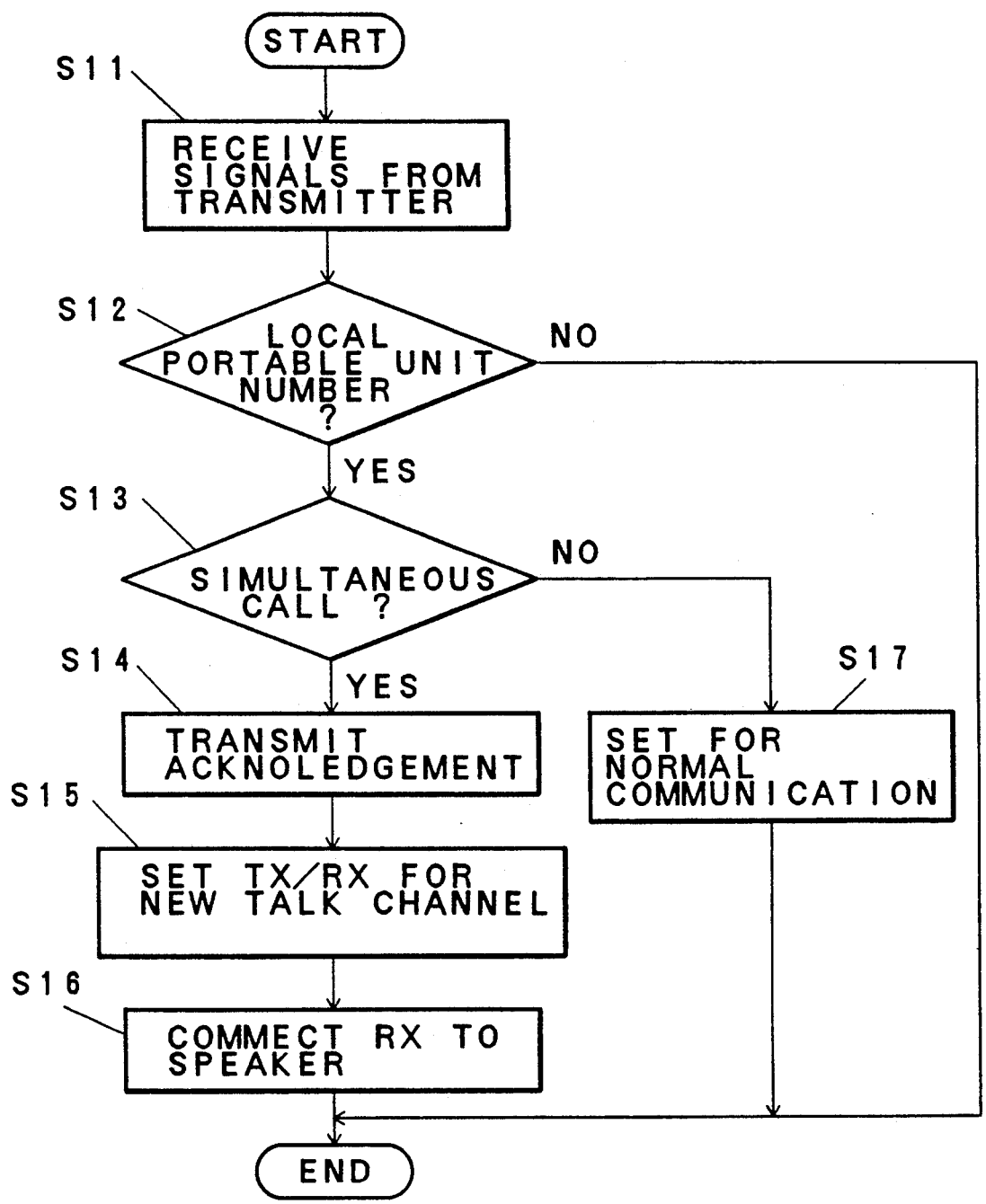

SIMULTANEOUS VOICE-CALL SYSTEM FOR CORDLESS TELEPHONE

BACKGROUND OF THE INVENTION

1. Field of the Invention

The present invention relates to a cordless telephone where the communication between a base unit and a portable unit or units is achieved through a radio, and more particularly to a simultaneous voice call system for a cordless telephone where a plurality of portable units are simultaneously called by the base unit and a voice message is sent to the portable units.

2. Prior Art

With conventional cordless telephone systems, an operator of a base unit dials to individually call portable units so as to send a voice message. The operator has to repeat as many dial operations as there are portable units the operator wants to call. This is a long time for the operator to complete all calls.

SUMMARY OF THE INVENTION

An object of the present invention is to provide a simultaneous voice call system for cordless telephone systems where a plurality of portable units are simultaneously called from the base unit to send a message at the same time to thereby simplify operations and reduce time required to complete message transmission.

The communication between a base unit and a plurality of portable units is established through the use of a radio communication channel. The base unit includes a transmitter/receiver which establishes a communication channel between said base unit and said plurality of portable units. The transmitter/receiver has a control channel and a plurality of talk channels. A portable-unit-identifying number memory stores portable-unit-identifying numbers preassigned to said plurality of portable units. A first simultaneous call controller responsive to a simultaneous call command from a user to establish a talk-channel between said plurality of portable units by transmitting through said control channel portable-unit-identifying numbers stored in said portable-unit-identifying number memory, a vacant-talk-channel number, and a simultaneous call code to said plurality of portable units. The talk-channel is a radio communication channel through which a message is transmitted from the base unit to said plurality of portable units. The simultaneous call code indicates that said message is transmitted to said portable units at the same time. Each of said plurality of portable units includes a portable-unit-identifying number assigned thereto and a second simultaneous call controller. The second simultaneous call controller receives through said control channel from said base unit said portable-unit-identifying number, talk-channel number, and simultaneous call code. The second simultaneous call controller switches the transmitter/receiver to said talk channel if said portable-unit-identifying number transmitted from the base unit is the same as the preassigned portable-unit-identifying number. The second simultaneous call controller connects the receiver output of said transmitter/receiver to a speaker to thereby receive said message from the base unit.

BRIEF DESCRIPTION OF THE DRAWINGS

Features and other objects of the invention will be more apparent from the description of the preferred embodiments with reference to the accompanying drawings in which;

FIG. 1A shows an embodiment of a base unit of a cordless telephone system according to the present invention;

FIG. 2A is a flowchart illustrating the operation of the base unit; and

FIG. 2B is a flowchart illustrating the operation of the portable unit.

DETAILED DESCRIPTION OF THE PREFERRED EMBODIMENTS

Description of the Preferred Embodiments

Figure 1B:
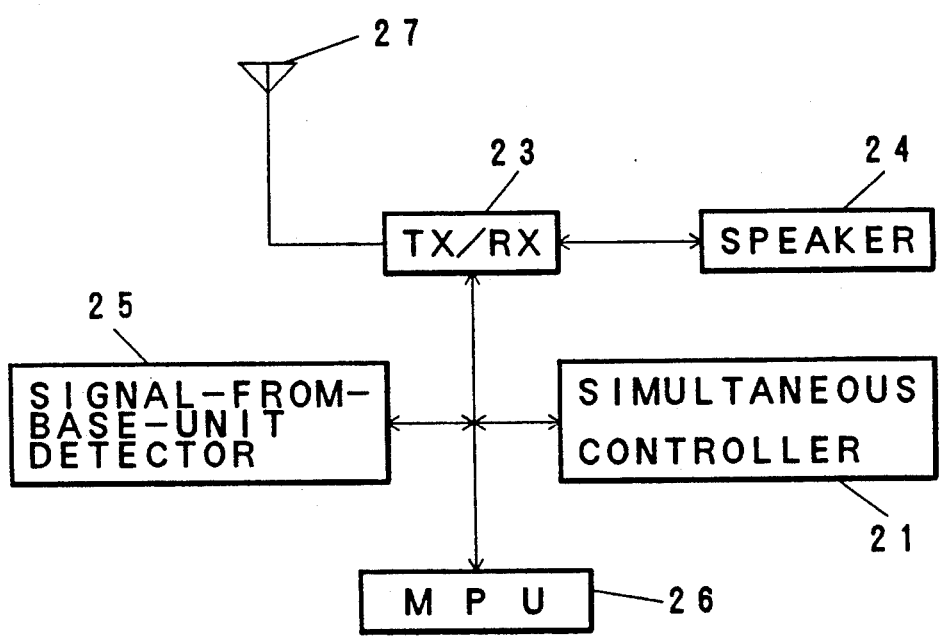
FIG. 1B shows an embodiment of a portable unit of a cordless telephone system according to the invention.

The present invention will now be described in detail with reference to the drawings.

FIG. 1A shows an embodiment of a base unit of a cordless telephone system according to the present invention. In the figure, a keyboard 16 has ten keys "0" to "9" for dialing a phone number and function keys such as "*" and "#." When an operator of base unit inputs commands necessary for simultaneous voice call through the keyboard 16, a microprocessor(MPU) 10 performs corresponding signal processing.

A portable-unit-identifying number memory 11 stores therein portable-unit-identifying numbers of all portable units to be connected with the base unit. When a simultaneous-voice-call controller 12 receives a simultaneous-call command from the MPU 10, the controller 12 sends three data to a transmitter/receiver 14. The three data are portable-unit-identifying numbers, a simultaneous-call code indicating that a message is going to be transmitted from base unit to a plurality of portable units at the same time, and a talk channel number through which communication is established between the base unit and the portable units. The portable-unit-identifying numbers are sent to the transmitter/receiver 14 one by one so that respective portable units are called in the order. The individual numbers have data indicating specific response timings different from each other so that the respective portable units respond to the basic unit in a predetermined order without the chance of interfering each other when they respond. The transmitter/receiver 14 has a control channel and a plurality of talk channels and transmits a radio wave through an antenna 19 over one the channels.

A vacant talk channel selecting sector 18 selects a vacant channel from a plurality of talk channels provided for communication between base unit and portable units.

A line exchanger 13 connects a handset 15 to the external telephone line when normal telephone call is to be made, and connects the handset 15 to the transmitter/receiver 14 when communication is to be made between the base unit and a portable unit, i.e., simultaneous voice call. A response-from-portable-unit detector 17 detects response signals from respective portable units.

FIG. 1B shows an embodiment of a portable unit of a cordless telephone system according to the invention. In FIG. 1B, a microprocessor(MPU) 26 performs all the necessary signal processing. A transmitter/receiver 23 transmits messages to and receives messages from the base unit. The transmitter-receiver 23 has the control channel and the plurality of talk channels. A signal-from-base-unit detector 25 receives the receiver output of transmitter/receiver 23 to detect a portable-unit-identifying number, a simultaneous-call code, and a talk channel number. If the received portable-unit-identifying number is the same number as the local portable unit number, then a simultaneous-voice-call controller 21 causes the transmitter/receiver 23 to be set for the talk channel specified by the base unit while also connecting the receiver output to a speaker 24.

General description of Operation

The portable-unit-identifying numbers are previously stored in the portable-unit-identifying number memory 11 of the base unit. When an operator of the base unit inputs a simultaneous-call command, the simultaneous-voice-call controller 12 outputs three data. They are portable-unit-identifying numbers stored in the portable-unit-identifying number memory 11, a talk channel number through which communication is established between base unit and portable units, and a simultaneous-call code indicating that the call from base unit is a simultaneous-voice call. The three data are transmitted from the transmitter-receiver 14 over the control channel.

The respective portable units receive the corresponding portable-unit-identifying numbers, talk channel number, and simultaneous-call code from the base unit over the control channel. If the portable-unit-identifying number received by a portable unit is the same as that assigned to that portable unit, then the simultaneous-voice-call controller 21 causes the transmitter/receiver 23 to be set for the specified talk channel while also connecting the receiver output to the speaker 24.

When the simultaneous-voice-call controller 12 has transmitted the three data, the controller 12 causes the transmitter/receiver 14 to be set for the same channel as is specified to the portable units. Then, an operator of the base unit inputs a voice message to the base unit over the talk channel.

Operation of Base Unit

The operation of the base unit will now be described with reference to the flowchart in FIG. 2A.

The portable-unit-identifying numbers are previously stored in the portable-unit-identifying number memory 11. When an operator inputs a simultaneous-voice-call command by means of the keyboard 16, the program proceeds to step 2 where the vacant talk channel selecting section 18 searches radio frequencies received through the antenna 19 for a vacant talk channel. At step 3, the simultaneous-voice-call controller 12 reads the portable-unit-identifying numbers from the portable-unit-identifying number memory 11 and sends the thus read numbers together with the talk channel number and simultaneous-call code to the transmitter/receiver 14. The transmitter/receiver 14 transmits the data through the control channel to the portable units. The respective portable unit receives the control channel and then performs signal processing before sending a response signal to the base unit through the control channel. At step 4, the response-from-portable-unit detector 17 detects response signals from respective portables units and then the program proceeds to step 5 where the controller 12 causes the transmitter/receiver 14 to be set for the vacant talk channel searched at step 2. At step 6, the operator inputs a voice message or speaks to the handset 15 and then the transmitter/receiver 14 transmits this voice message to the respective portable units over the talk channel. When the base unit has completed the transmission of the voice message at step 6, the base unit sends out a ring-off signal at step 7. When the portable units receives the ring-off signal from the base unit, all the control procedures for simultaneous-voice-call are disabled and the base unit returns to its standby condition.

Operation of Portable Unit

At step 11, the transmitter/receiver 23 receives the control channel from the base unit. When the signal-from-base-unit detector 25 receives the receiver output of transmitter/receiver 23 and detects the three data transmitted from the base unit at step 3, the program proceeds to step 12 where a check is made to determine whether the portable-unit-identifying number sent from the base unit is the same as that assigned to the local portable unit. If NO, the program stops. If YES, then a decision is made at step 13 to determine whether the call is a simultaneous-voice-call. If the answer is NO at step 13, then the program proceeds to step 17 where signal processing for normal call is carried out; if YES, then the program proceeds to step 14 where the portable unit sends through the control channel a response signal for acknowledgement of reception of the portable-unit-identifying number, talk channel number and simultaneous-call code. The simultaneous-voice-call controller 21 then causes at step 15 the transmitter/receiver 23 to be set for the talk channel specified by the base unit while also connecting at step 16 the receiver output to a speaker 24 which radiates the voice message.

Although the portable-unit-identifying numbers assigned to the respective portable units are transmitted at step 3, a number not assigned to any portable unit, e.g., "0" may be transmitted to the portable units if all the portable units are to be called. Then, the respective portable unit interprets the number "0" as indicating simultaneous-voice-call. This saves the time required for transmitting a voice message.

While the voice message is directly inputted to the handset at step 6, a voice message such as "Your dinner is ready" may be stored in a memory, not shown, so that the message is automatically read from the memory after completion of step 5 and is transmitted to the portable units.

What is claimed is:

1. A simultaneous voice-call system for cordless telephone where communication between a base unit and a plurality of portable units is established through the use of a radio communication channel, said base unit comprising:

a radio control channel and a plurality of radio talk-channels;

a memory for storing portable-unit-identifying numbers, each of which being preassigned to each of said plurality of portable units;

a first controller responsive to a simultaneous call command from a user to establish radio talk-channel between said plurality of portable units by transmitting through said radio control channel portable-unit-identifying numbers stored in said memory, a vacant-talk-channel number, and a simultaneous call code to said plurality of portable units, said talk-channel being a radio communication channel which is not currently used by other cordless telephones and through which a message is transmitted from the base unit to said plurality of portable units at the same time, said simultaneous call code indicating that said message is transmitted to said plurality of portable units at the same time: and each of said plurality of portable units comprising;
a local portable-unit-identifying number preassigned thereto; and
a second controller for receiving through said radio control channel from said base unit said portable-unit-identifying number, radio talk-channel number, and simultaneous call code, said second controller switching the transmitter/receiver to said talk-channel if said portable-unit-identifying number transmitted from the base unit is the same as the preassigned local portable-unit-identifying number, and said second controller connecting a receiver output of said transmitter/receiver to a speaker to thereby receive said message from the base unit.

* * * * *